M. W. PEASLEY.
CONVEYER.
APPLICATION FILED MAR. 28, 1919.
1,335,076.
Patented Mar. 30, 1920.
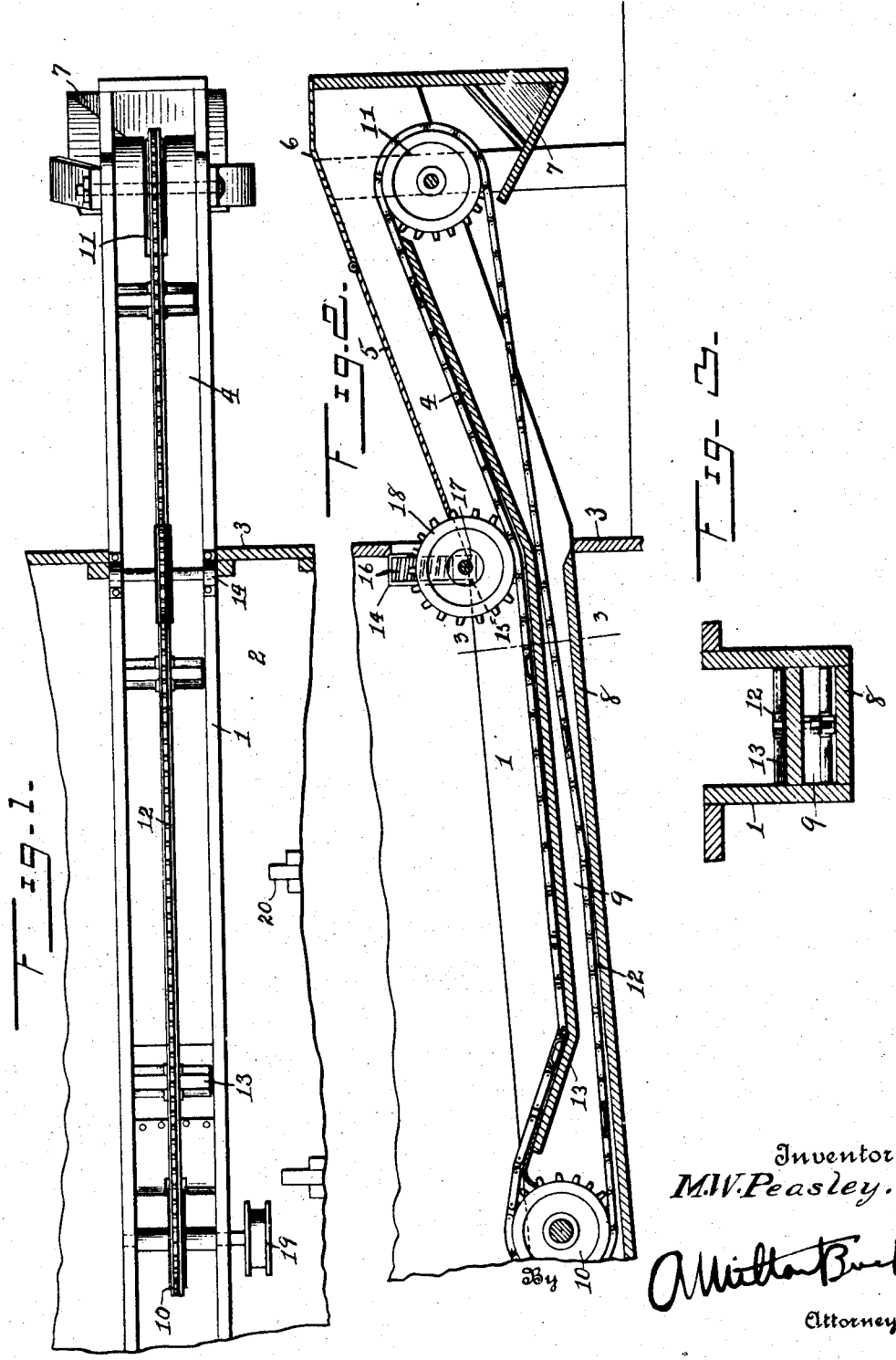
Inventor
M.W. Peasley.
By
Attorney

UNITED STATES PATENT OFFICE.

MYRON W. PEASLEY, OF RANDOLPH, NEW YORK.

CONVEYER.

1,335,076.   Specification of Letters Patent.   Patented Mar. 30, 1920.

Application filed March 28, 1919. Serial No. 285,894.

*To all whom it may concern:*

Be it known that I, MYRON W. PEASLEY, citizen of the United States, residing at Randolph, in the county of Cattaraugus and State of New York, have invented certain new and useful Improvements in Conveyers, of which the following is a specification.

This invention relates to conveyers especially adapted to be used in stables for removing manure from the aisles between the stalls, and it consists in the novel features hereinafter described and claimed.

An object of the invention is to provide an apparatus of the character stated, which is of simple and durable structure, and which will effectually remove the manure from the vicinity of the stalls and animals occupying the same, whereby the stable is kept in a clean and sanitary condition.

A further object of the invention is to provide an apparatus of the character stated, which is adapted to elevate the manure at the delivery end thereof so that the manure may fall or gravitate into a boat or other suitable receptacle preparatory to spreading upon the soil.

Another object of the invention is to provide in an apparatus of the character stated, scrapers of suitable design adapted to engage the manure and move the same along a trough and up the inclined portion thereof as the movable part of the conveyer is operated.

With these objects in view the apparatus comprises a trough adapted to be embedded in the floor of a stable behind the stalls thereof and having an end portion which projects through the end or side wall of the stable. A chain is mounted for movement along the trough and suitable pulleys are provided for moving and guiding the chain, and the chain is provided at intervals with the blades or scrapers. The chains and wheels are adapted to be operated by an engine or other suitable power device.

In the accompanying drawing:

Figure 1, is a top plan view of the manure conveyer.

Fig. 2, is a longitudinal sectional view of the same.

Fig. 3, is an enlarged sectional view of the same cut on the line 3—3 of Fig. 2.

As illustrated in the accompanying drawing, the manure conveyer comprises a trough 1, having a portion thereof embedded in the floor 2, of the stable, of which the wall 3, is a part. The trough includes an inner end portion 4, which passes through the wall 3, and extends outside of the building. The portion 3, is provided with a top 5, and a hinged cover 6, which may be swung back when it is desired to get at the interior of the inclined portion of the trough, for adjustment, repairs or other purposes. A chute 7, is provided at the outer end of the inclined portion 4, of the trough. A partition 8, is located under the inner portion of the trough 1, and forms a passage way 9, below the bottom of the inner portion of the trough. A sprocket wheel 10, is journaled at the inner portion of the trough 1, and a sprocket wheel 11, is journaled at the outer end of the inclined portion 4, of the trough. A chain 12, is trained around the sprocket wheels 10 and 11, and carries at suitable intervals scraper blades 13. The lower run of the chain 12, passes through the passage way 9, as best shown in Fig. 2, of the drawing.

Guides 14, are located at the sides of the trough 1, and in the vicinity of the wall 3. Blocks 15, are movably mounted in the guides 14, and springs 16, bear at their lower ends upon the blocks and at their upper ends against the intermediate portions of the guides 14. The said springs are under tension with a tendency to hold the blocks under lowered portions in the guides.

A shaft 17, is journaled in the blocks 15, and a sprocket wheel 18, is mounted upon the shaft 17, and bears against the upper run of the chain 12, approximately at the point where the inclined portion of the trough 4, merges with the inclined portion of the trough, as best shown in Fig. 2.

The shaft upon which the sprocket wheel 10, is mounted is provided with a pulley 19, around which a belt may be trained for rotating the sprocket wheel 10. The partitions of the walls of the stable are indicated at 20, in Fig. 1, of the drawing.

In operation the sprocket wheel 10, is rotated as hereinbefore indicated, which moves the upper run of the chain 12, along the trough and the lower run of the said chain through the passage way 9. Thus the scraper blades 13, are carried along the trough 1, and up along the inclined portion 4, thereof. The animals stand in the stalls of the stable and between the partitions 20, as usual, and when they drop excrement it falls in the inner portion of the trough 1, and is encountered by the scraper blades which moves the excrement along the trough and through the wall 3, and up along the inclined portion 4, of the trough when the excrement arrives over the sprocket wheel 11, it falls by gravity through the chute 7, and may deposited in a boat (not shown) or other receptacle provided for its reception. Inasmuch as the sprocket wheel 18, may be moved vertically should it encounter any solid matter it may be moved in an upward direction and permit the matter to pass under without interfering with the operation of the apparatus.

The springs 16, will cause the wheel 18 to descend and assume its proper position upon the shaft when the solid matter has been moved out of the building.

From the foregoing description, taken in conjunction with the accompanying drawing, it will be seen that a manure conveyer of simple and durable structure is provided, and that the same may be conveniently used for removing excrement from a stable and thereby keep the same in a clean and sanitary condition and deposit the manure so that it may subsequently be used for a fertilizer.

Having described the invention, what is claimed is:

In a conveyer of the class described the combination with a stable and its floor of a trough having a portion thereof embedded in said floor, said trough having one end inclined, a chute at said inclined end, a partition located under the inner portion of said trough to form a passage way below the bottom of said trough, a sprocket wheel journaled at the lower portion of said trough, a sprocket wheel journaled at the upper portion of said trough, a chain trained over said wheels, scraper blades fixed to said chain, the lower portion of said chain passing through said passageway, guides located at the sides of said trough, blocks movably mounted in said guides, springs urging said blocks downward, a shaft in said blocks, a sprocket on said shaft bearing against the upper run of said chain and means for driving said wheels.

In testimony whereof I affix my signature.

MYRON W. PEASLEY.